(No Model.)

G. WRAGG.
POTATO DIGGER.

No. 318,073.  Patented May 19, 1885.

Witnesses.
A. Ruppert.
W. Rurris

Inventor
George Wragg,
Per
Thomas P. Simpson,
Attorneys.

UNITED STATES PATENT OFFICE.

GEORGE WRAGG, OF SHARPSBURG, PENNSYLVANIA.

POTATO-DIGGER.

SPECIFICATION forming part of Letters Patent No. 318,073, dated May 19, 1885.

Application filed February 2, 1885. (No model.)

*To all whom it may concern:*

Be it known that I, GEORGE WRAGG, a citizen of the United States, residing at Sharpsburg, in the county of Allegheny and State of Pennsylvania, have invented a new and useful Improvement in Potato-Diggers; and I hereby declare the following to be a full, clear, and exact description thereof, reference being had to the accompanying drawings, forming a part thereof.

Figure 1:
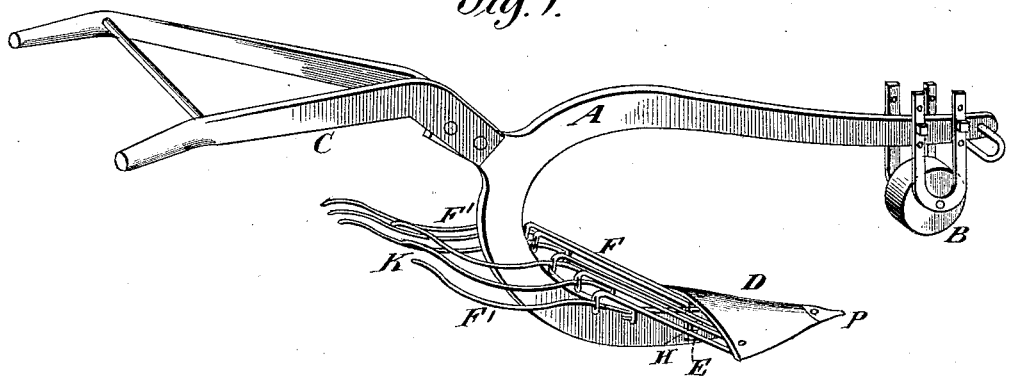
Figure 2:
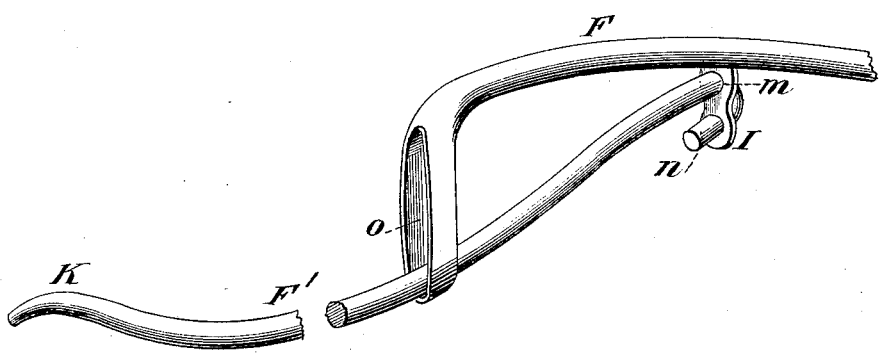
Figure 3:
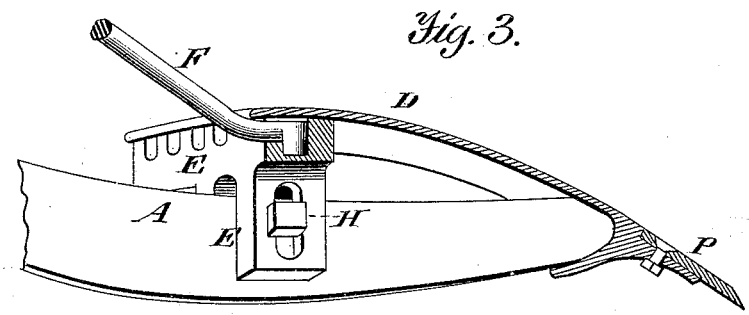

Figure 1 is a perspective view of my improved potato-digger. Fig. 2 is a perspective view of the shaker. Fig. 3 is an enlarged sectional perspective view of the shovel, the shaker-frame with the beam and one of the shakers attached.

Like letters, where they occur, refer to like parts.

This invention relates to that class of shovel-plows known as "potato-diggers."

The object of this invention is to construct a machine that will shake the fingers completely, and thus rake all the potatoes to the surface.

In the manufacture of my improved potato-digger I use a plow-beam, A, made of iron or steel, of the form shown in Fig. 1. At the front end it is provided with a weed-roller, B. This roller is four inches (more or less) in width on its face, and is adjustable in height.

At the rear part of the beam A are attached the handles C C. At the lower end of the beam A are attached the mold-board D, the shaker-frame E, and the fingers F and F'. That portion of the fingers marked F is adjusted into cavities in the top of the frame E. When the fingers are all put in their places, the mold-board D is then put on top and screwed down, so that the fingers will be held tight, and may be easily removed for repairs, when so desired. When the fingers F and the mold-board D have been so adjusted, the beam A may be put in position and screwed fast to the frame E, with its front resting in the mold-board D, as shown in Fig. 3. It will be noticed that the pitch of the mold-board may be raised or lowered by means of the bolt H, which passes through the beam, and is provided with an oblong slot in the frame E. It will be noticed that the fingers F at the projecting end are bent down and slotted, as at *o* in Fig. 2.

At about midway from the frame E to *o* the fingers are provided with an eye-bar, I, which projects from the under part of the finger. This eye-bar has two holes in it. The shaking-fingers F' are bent at the front end to correspond with the holes in the eye-bar I, and the other end is curved upward, as at K in Fig. 2. The end K is passed through the hole *m* in eye-bar I, and is then drawn through the slot *o* until the end *n* is through the eye-bar. By this arrangement the shaking-fingers F' may move freely up and down without increasing or diminishing the lateral distance from each other. It will also be noticed that the mold-board is provided with a plow-point, which may be readily replaced, as shown at P.

This potato-digger is cheaply constructed, and by the independent up-and-down movement of the shaking-fingers the potatoes are shaken to the surface effectually. The broad-surfaced weed-rolling colter flattens down the weeds, levels off the surface of the earth, and prevents the mold-board from dipping in and taking a deeper cut than desired.

In practice the outer ends of the shaking-fingers will slide over the surface of the ground, the earth will break up and fall through the fingers, while the potatoes will gently slide over them and be deposited on the surface of the ground.

What I claim, and desire to secure by Letters Patent, is—

1. The combination, with beam A, of a mold-board having an under lip at the front end and a slotted frame, E, made adjustable vertically on said frame, whereby the pitch of plow may be regulated, as described.

2. The fingers F, having downward loop, and the bar I, having two holes, *m n*, the shaking-fingers F passing through said loop, and working in the holes of said bar, as shown and described.

GEORGE WRAGG.

Witnesses:
HENRY C. LYON,
GEO. C. BAILEY.